Sept. 11, 1956 L. A. MEACHAM 2,762,867

SUBSCRIBER TELEPHONE CIRCUIT

Filed June 16, 1953

INVENTOR
L. A. MEACHAM
BY
John E. Cassidy
ATTORNEY 2,762,867

SUBSCRIBER TELEPHONE CIRCUIT

Larned A. Meacham, New Providence, N. J., assignor to Bell Telephone Laboratories, Incorporated, New York, N. Y., a corporation of New York Application June 16, 1953, Serial No. 361,953

7 Claims. (Cl. 179—81)

This invention relates to an improved subscriber telephone set circuit. More particularly this invention relates to an improved subscriber telephone set circuit comprising an amplifier. Precisely the present invention relates to a subscriber telephone set circuit of the anti-sidetone type having a semiconductor amplifier in the line circuit and a balancing semiconductor amplifier in the anti-sidetone circuit of the set.

An object of the invention is the improvement of a subscriber telephone set circuit.

A more particular object of the invention is the improvement of a subscriber telephone set circuit having an amplifier which comprises a semiconductor element, known in the art as a transistor.

A feature of the invention is a plurality of transistors connected in parallel to form an amplifier of increased current carrying capacity.

Another feature of the invention is a single transistor having balanced collector circuits.

Another feature of the invention is a circuit having a single transistor and a balancing transistor.

Another feature of the invention is an amplifier comprising a plurality of transistors in parallel and a balancing amplifier having an equal plurality of transistors in parallel.

As is well known, subscriber telephone set circuits, or substation circuits, as they are otherwise known, are circuits which enable signals in the voice frequency range to be transmitted and received. They are most frequently located on a telephone subscriber's premises and are effective to permit communication generally through telephone switching circuits with other subscriber telephone set circuits located on remote premises. Essentially they each comprise a telephone transmitter, a telephone receiver, and associated apparatus and circuitry to perform these functions. The present circuit comprises also a balanced amplifier which amplifies the signals transmitted to the line from the transmitter in the same set and also amplifies equally signals transmitted into the impedance in the anti-sidetone circuit which balances the line, so as to minimize the sidetone which otherwise would be produced in the set receiver. An anti-sidetone circuit, as is well known, is one which minimizes sidetone, that is the effect caused in a telephone receiver by speech or other signals, such as noise, impressed on the transmitter of the same telephone set circuit. Obviously it is desirable that this effect be kept to a reasonable minimum.

There are presently well known in the art a number of arrangements which are effective to minimize sidetone. Among these are the arrangements shown in Patents 1,254,116, 1,254,117 and 1,254,118 all granted to G. A. Campbell January 22, 1918 and Patent 2,287,998 granted to K. S. Johnson June 30, 1942.

The present subscriber telephone circuit differs from those disclosed in the above-identified patents in that the circuit includes a semiconductor amplifier, known in the art as a transistor to amplify the current transmitted into the line and a corresponding amplifier connected in the anti-sidetone circuit. The semiconductor or transistor is a translating and amplifying device which may be, for instance, of germanium as described in Patent 2,524,035 granted October 3, 1950. In an illustrative device the transistor may be of a high back voltage, N-conductivity type germanium produced, for example, as described in Patent 2,602,211 granted July 8, 1952 to J. H. Scaff and H. C. Theuerer. The present transistor in one embodiment may comprise a single point contact emitter and two point contact collectors, all of Phosphor bronze, for instance. Each collector may be spaced individually from the emitter of the order of .002 inch. The transistor comprises also a single base which may be, for instance, of copper or rodium plating upon the body of the semiconductor material. In other embodiments the transistor employed may have a single emitter and a single collector together with the usual base element. When this arrangement is used, however, a pair of transistors are employed in one embodiment. In another embodiment a larger number of transistors are employed.

Attention is particularly called to the fact that the invention may be practiced with a single transistor having two collectors, two transistors each having the conventional single emitter and single collector or, where larger output is desirable, a plurality of transistors may be connected in each branch of the circuit so long as the outputs are balanced in the two branches.

There are a number of important advantages afforded by the use of transistors in subscriber telephone circuits. One important advantage is that they provide amplification without requiring power sources at the subscriber station. Another is that they require no filament circuits and no filament battery supply is required. The transistor circuit can be arranged so that it is self-biasing and the potential source may be located at the central station. In addition to the foregoing there are the well-known considerations that transistors are inexpensive, relatively sturdy and require small space for mounting.

The invention may be understood from the following description when read with reference to the associated drawings which taken together disclose preferred embodiments in which the invention is presently incorporated. It is to be understood, however, that the invention is not limited to the present embodiments but may be practiced with other embodiments which will be readily suggested to those skilled in the art by the consideration of the following.

In the drawings:

Fig. 1 discloses a simplified form of the invention in which a transistor having two collectors is employed;

Figure 1:
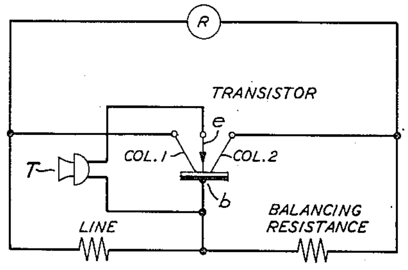

Referring now to Fig. 1 which shows one preferred embodiment of the invention wherein, in the interest of clarity, the circuit is shown in simplfied form, the direct-current supply being omitted. The transmitter T is connected between emitter *e* and base *b* of a transistor having two collectors, col. 1, col. 2, with similar characteristics. The telephone line is connected between one collector, col. 1, and base *b*. A balancing resistance or impedance is connected between the other collector col. 2 and the base *b*. The telephone receiver R is bridged from one collector to the other.

A signal received from the line is effectively impressed across the telephone receiver R in series with the line and the balancing resistance. It is, therefore, only moderately attenuated. If the internal collector resistances of the transistor are relatively high the presence of the transistor will have little effect upon this attenuation.

In contrast, a signal current produced in the transmitter T is supplied to the emitter *e*, and amplified versions thereof are delivered through the two collectors, col. 1 and col. 2. If the two collectors have characteristics which are reasonably well matched, and if the balancing impedance is equal to that of the line, there will be little or no voltage difference between the two collectors. As a result, sidetone to the telephone receiver R is suppressed. The full-signal power output of one of the collectors, however, is delivered to the line.

Figure 2:
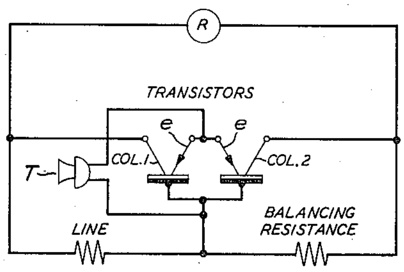
Fig. 2 shows another simplified form of the invention in which two transistors are employed.

In the embodiment shown in Fig. 2 two conventional transistors are employed. The emitters, individual to each transistor, are connected together and to one side of the transmitter T and the bases, individual to each transistor, are connected together and to the opposite terminal of the transmitter T. The operation of the embodiment per Fig. 2 is substantially the same as that of the embodiment per Fig. 1. The embodiment per Fig. 2 has the advantage over that of Fig. 1 in that it affords increased power output capacity and greater convenience in matching transistor characteristics.

Figure 3:
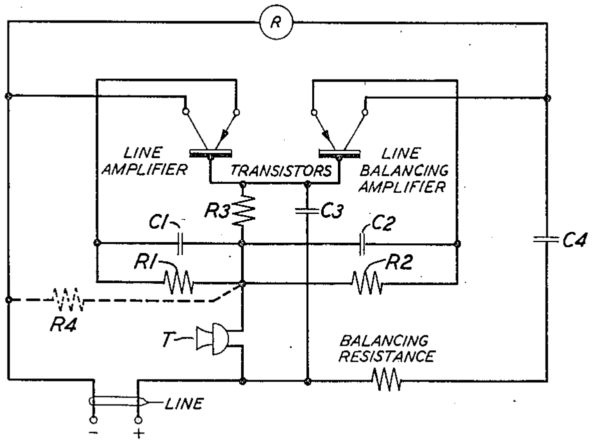
Fig. 3 shows a more detailed circuit configuration including means for supplying direct-current bias potential.

Refer now to Fig. 3 which shows a more detailed circuit configuration and which includes means for supplying direct-current bias potential. Fig. 3, as is apparent, is an elaboration of the arrangement in Fig. 2. Fig. 1, it is obvious, may be similarly elaborated using a suitable transistor having two collectors and eliminating resistor element R2 and capacitor element C2, both in Fig. 3. Resistors R1 and R2 in the emitter path and resistor R3 in the base path are self-biasing elements, associated respectively with by-pass condensers C1, C2 and C3 of large capacitance. C4 is also a by-pass condenser of large value which prevents excessive current drain from the line by way of the balancing resistance or impedance in series with the low resistance receiver R. It will be noted that all of the direct current drawn by the transistors passes through the transmitter T, which may be, for instance, of the carbon button type, to provide biasing current for the latter. Resistor R4 may be employed, if desired, to pass additional biasing current through the carbon button of the telephone transmitter. The collector current of the right-hand transistor passes through the low resistance telephone receiver R and may be used to contribute to its magnetic bias. Operation of the embodiment per Fig. 3 is as described for Figs. 1 and 2.

Attention is particularly called to the fact that the line amplifier may be employed without the balancing amplifier and balancing impedance and it may comprise any number of transistors connected in parallel to afford the desired current carrying capacity in circuits which do not include an anti-sidetone feature.

Figure 4:
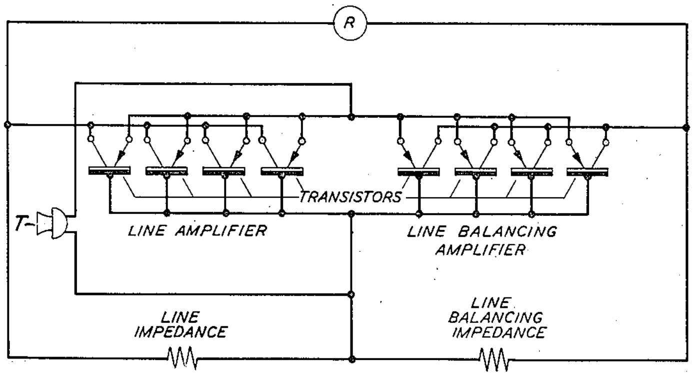
Fig. 4 shows another simplified arrangement of the invention in which a plurality of transistors are connected in parallel in both the line branch and the balancing branch of the circuit.

A typical set of parameters might be as follows:

Line impedance=600 ohms
Balancing resistance=600 ohms
Transmitter impedance=300 ohms
Receiver impedance=1200 ohms
Line voltage, direct current=48 volts at office The transistor parameters for each transistor might be as follows:

$r_e$=240 ohms
$r_c$=19,000 ohms
$r_b$=290 ohms
$r_m$=34,000 ohms
$i_e$=1 milliampere
$i_c$=3 milliamperes Total current drawn by subset=6 milliamperes approximately $R_1=R_2=$15,000 ohms
$R_3=$3,600 ohms
$C_1=C_2=C_3=C_4>\mu f$ In the arrangement shown in Fig. 4, a plurality of transistors, such as four, for instance, are connected in parallel so as to increase the current carrying capacity of the line amplifier. A corresponding plurality, such as four, for instance, are connected in the anti-sidetone circuit.

The invention contemplates a plurality of transistors connected in parallel in an amplifier without a balancing amplifier in many applications.

What is claimed is:

1. In a telephone system, a telephone line, a subscriber telephone set circuit having a telephone transmitter, a telephone receiver, an anti-sidetone element and a transistor, a series circuit extending sequentially through said line, said telephone receiver and said anti-sidetone element, said transistor having a base connected to the junction of said line and said anti-sidetone element, said transmitter connected between said base and an emitter of said transistor and a first and a second collector in said transistor connected to a first and a second terminal of said receiver respectively.

2. In a telephone system, a subscriber telephone set circuit, comprising a telephone transmitter, a telephone receiver, a line balancing impedance element and a semiconductor amplifying means, said amplifying means having an input circuit comprising said transmitter and a first and a second output circuit, said output circuits balanced, a first individual connection from said first output circuit to said line, a second individual connection from said second output circuit to said impedance element, said receiver connected across said first and said second output circuits.

3. In a telephone system, a telephone line, a subscriber telephone set circuit having a telephone transmitter and a telephone receiver, both connected to said line, a line amplifier in said circuit, said amplifier comprising a plurality of semiconductors, each of said semiconductors having an individual input circuit and an individual output circuit, said transmitter connected to all of said input circuits arranged in parallel, said line connected to all of said output circuits arranged in parallel.

4. A system in accordance with claim 3 having an anti-sidetone balancing amplifier balancing said line amplifier, said balancing amplifier connected to an impedance in said circuit balancing the impedance of said line.

5. A system in accordance with claim 3 having a balancing amplifier balancing said line amplifier, said balancing amplifier having a plurality of semiconductors corresponding to said plurality in said line amplifier and a balancing impedance balancing said line impedance connected to said balancing amplifier.

6. In a communication system, a line, an impedance balancing said line, a signaling circuit comprising transmitting and receiving means connected to said line and to said impedance, a semiconductor amplifier in said circuit, said amplifier having a dual output circuit including a pair of corresponding elements, one of which elements is connected to said line and the other of which elements is connected to said impedance.

7. In a communication system, a line, a signal transmitting circuit connected to said line, said circuit having an amplifier, said amplifier comprising a plurality of semiconductor elements, said elements having individual input circuits connected in parallel and in series with a signal transmitter in said circuit, said elements having individual output circuits connected in parallel and in series with said line.

No references cited.